F. TSCHUDY.
METHOD OF PRODUCING AMMONIUM SULFATE.
APPLICATION FILED SEPT. 21, 1914.
1,155,385.
Patented Oct. 5, 1915.
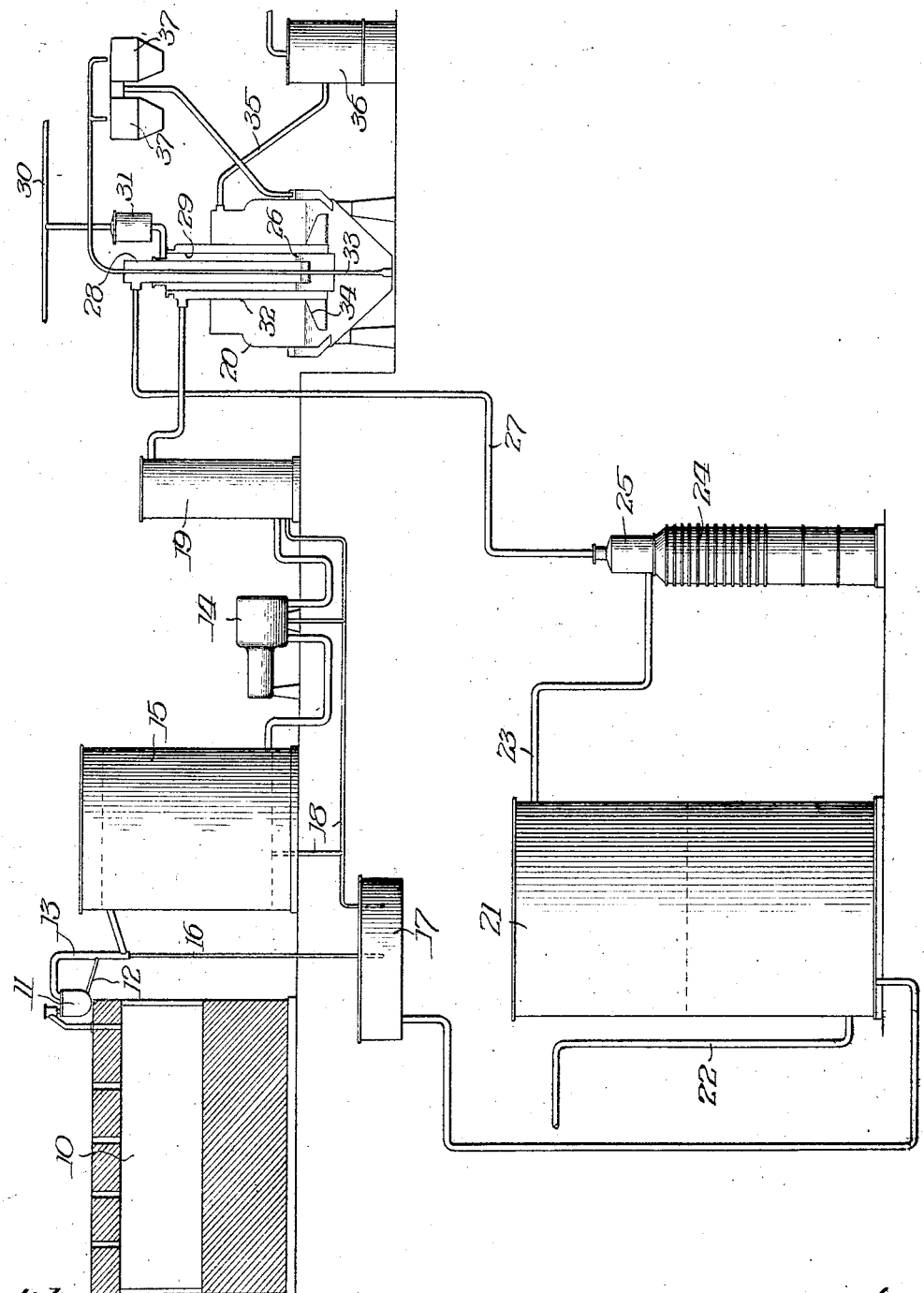

UNITED STATES PATENT OFFICE.

FREDERICK TSCHUDY, OF FAIRFIELD, ALABAMA.

METHOD OF PRODUCING AMMONIUM SULFATE.

1,155,385.   Specification of Letters Patent.   Patented Oct. 5, 1915.

Application filed September 21, 1914. Serial No. 862,833.

*To all whom it may concern:*

Be it known that I, FREDERICK TSCHUDY, a citizen of the United States, and resident of Fairfield, in the county of Jefferson and State of Alabama, have invented certain new and useful Improvements in Methods of Producing Ammonium Sulfate, of which the following is a specification.

This invention relates primarily to a method of purifying gases of carbonization, and secondly, to a method of producing ammonium sulfate.

In the process of manufacture of ammonium sulfate $(NH_4)_2SO_4$ from gases produced by distillation of fuel such as coal in coke ovens, gas retorts, and the like, the gas evolved from the fuel charged during the distilling period is usually cooled in order to condense the tar as well as water contained therein. The cleaned gases either previously superheated, or at the temperature they have attained when reaching the saturator are then passed through a bath of sulfuric acid. In the saturator the ammonia is converted into sulfate while the gas is conveyed to the respective points of consumption. In such a process it is essential that the gas be cooled to a low temperature, at least to that nearest the dew point of tar, and considerably below the dew point of water, so that the gas leaving the coolers is free from heavy tar and practically free from tar oils and water. The water present in the products of distillation originate either from the coal, as native moisture, or from the washed coal, as adhesive moisture. The process of water condensation starts in the gas conveying system where the temperature of the gas reaches the dew point of water and increases as the temperature of the gas drops toward the dew point of the tar. The amount of condensation depends entirely on the physical condition of the coal, which when charged dry, usually gives off during distillation from 4 to 5% of water, while in some cases where coal must be washed and charged comparatively wet, the total condensation of the water often amounts to over 16% of the weight of the coal charged. The water condensing out with the tar and tarry oils in the system between the ovens and the saturators, and the various interposed apparatus as well as collecting main, fuel gas main, coolers, exhausters, and tar extractors, is collected in various manners and by diverse apparatus in settling tanks, from which the decanted water containing a considerable amount of free and fixed ammonia is brought by diverse manners or various apparatus to the ammonia still to be evaporated. Evaporation of the ammonia, both free and fixed, from the liquor brought to the still is accomplished by well known application of steam and alkaline agents. The aqueous vapors containing the liberated ammonia are then either introduced into the gas before or after passing through the coolers, or they are taken directly into the sulfuric acid bath where the ammonia is separated by the bath and the aqueous vapors commingled with the oven gas.

The oven gas, gradually giving off heat in the mains through which it passes, is cooled down in the cooler or condenser to the temperature as low as is consistent with the degree of tar extraction desired, usually to about 75 or 85° F. From the cooler the gas is taken up by the exhausters and passed to the saturator, either at the temperature it attains in the exhausters, or at a higher temperature brought about by a re-heating. Between the exhauster and the saturator, a tar extractor of any design may be inserted if the condenser should not remove the tar to the desired minimum.

The process above described is followed with various modifications, but in all thereof it is evident that the gas is subject to an actual re-heating to a greater or less extent even though stress is laid on the point that no gas is re-heated. Any gas, which by action of a machine, undergoes an increase in pressure, has its temperature increased by the compression and the degree of heating depends entirely on the amount of compression to which the gas is subjected. Therefore, wherever there is an exhauster placed between the cooler and the saturator, the gas conveyed thereby is changed in temperature and the gas cannot therefore reach the saturator without a certain specific degree of re-heating. The temperature rise in gas passing through the so-called blowers or exhausters ranges from 10 to 25° F., with rotary blowers—to from 20 to 50°, with low pressure centrifugal blowers—and considerably above 50° if the gas is subject to a high compression.

The drawbacks in the several arrangements mentioned are that they do not permit of an economical operation with the utilization of the least amount of energy from some source other than the energy due to the heat of the gases; that they require large apparatus in which the spaces are not utilized properly, and auxiliary apparatus for the generation of the external energy, and they do not make proper use of waste heats and heats of reaction. So, for instance, to bring the vapors of the ammonia still into the gas main before the gas is cooled, brings all the hot ammoniacal vapors, leaving the still at about 210° F., in contact with the comparatively dry gas at about the same temperature, capable of carrying along water in suspension in abnormally large quantities. Bringing this water-laden gas into the cooler does not only overload the cooler and consequently reduce the capacity at a given water consumption but the water from the still and the water contained in the gas, as previously alluded to, is condensed in the cooler, and a surplus thereof coming from the still acts as a diluter to the liquor derived from the aqueous vapor contained in the gas not condensed prior to reaching the cooler. This diluted liquor therefore has to be returned as weak liquor to the still to be again condensed. In this manner the still is unnecessarily overloaded and the operation requires not only more steam but more water. By mixing the gas as alluded to, the suction side of the blower is loaded with additional weight required to convey the heavy aqueous vapors to the cooler.

Where the aqueous vapors of the still are mixed with the gases between the blower and the saturator, they bring into the gas all the water their temperature is able to carry, and it therefore becomes necessary to keep the saturator bath at a temperature high enough to keep these vapors in suspension in the gas. If this be not done the condensed vapors would dilute the sulfuric acid bath. In such operation the sulfuric acid bath must therefore be of a temperature approximately that of the mixed gas entering. This temperature is regulated in some of the processes by additional re-heating of the gas while in other processes the vapors are super-heated to convey sufficient heat to the bath to maintain the high temperature required. In the case where the vapors are introduced before the saturator, it becomes evident that the pressure of these vapors must be somewhat higher than the pressure of the gas leaving the exhauster. This requires that the still be operated under a pressure considerably higher than that required for liberating the ammonia. The pressure varies at the discharge end of the blower from 2½ to 5 pounds per square inch and the pressure at the still must therefore be sufficient to overcome the friction in the pipes conveying the vapors, as well as the pressure in the gas main where the vapors enter. In all cases where, to obviate the above described shortcomings, the ammonia vapors from the still are brought directly into the saturator bath, they must be introduced at a pressure equal to that of the gas, or a pressure even higher than that of the gas. This is accomplished either by high operative pressure on the still or then by bringing the vapors to the pressure required.

The object of my invention is to convey the gas from the coolers to the blowers at the lowest possible temperature. The blowers working at a minimum of compression, will increase the temperature of the gas but slightly and I regulate the temperature of this gas inside of the saturator as well as the temperature of the acid bath by the use of waste heat of the aqueous vapors of the ammonia still, to a temperature about 40° F. less than the temperature which must be maintained by the several examples given above. A temperature of 100 to 105° F. is best adapted for an economical production of clean sulfate when the gases have been cooled to or below the dew point of tar, and when they carry only the amount of water in suspension permitted by that temperature. This temperature, being lower than the temperature stated for the saturator bath, will permit keeping what little aqueous vapor that may be in the gas in suspension. At a temperature of from 70 to 85° F. tar and tarry oils have been removed, even without the use of the final tar extractor, to such a degree that no contamination of the sulfate need be feared. In this invention no other means for raising temperatures, such as steam, hot air, hot gas, or hot water are used, outside of waste heat inside of the saturator for the purpose of balancing the temperature of gas and acid bath, and heavy losses in pressure by re-heaters, or extra power used in boosters, or heating agents, used for raising temperatures of gas or vapors, are done away with. The temperatures stated relate to the use of sulfuric acid at 60 degrees Bé. If other than such acid is used, the temperature given must be changed in accordance with the content of water in such acid as may be used.

The ammonia vapors are liberated at the ammonia still under a low pressure just sufficient to overcome the friction in the pipe system, and the head of a small seal of acid in the separator to which reference will be made later on. The ammonia still will operate in this manner under the minimum pressure and consumption of steam, and no appurtenances are used to accelerate the flow of the vapors or increase their pressure as originally attained in the still. Five pounds of steam pressure on the ammonia still, as against thirteen and fifteen pounds in common use will suffice to produce the desired results.

My invention will be more readily understood by reference to the accompanying drawing in which the figure is a diagrammatic illustration of a plant of the character described.

Referring more particularly to the drawing it will be seen that the gases of carbonization coming from the coke ovens 10, are collected in the gas collecting main 11, and reduced in temperature by radiation. Tarry matter is condensed in this main and flows through pipe line 12, into the foul gas main 13 as indicated. From the gas collecting main 11, the gases travel under suction of the exhauster 14, to the cooler 15. By radiation, the temperature of the gas in the gas main 13, is reduced so that it gives off a tarry condensate containing part of the original moisture in the coal. This preliminary, or high temperature, condensate is drained by line 16, to the tar receptacle 17. In the cooler 15, the gas is brought to a temperature of about 75 to 85° F., at which temperature practically all the tar and water originally contained in the gas is condensed. The condensate is brought from the cooler 15, by line 18, to the tar receptacle 17, as is also all tarry or aqueous condensate from the exhauster 14, and the final tar extractor 19. The gas passes, actuated by exhauster 14, through the final tar extractor 19, to the saturator 20, to be treated, as hereinafter described. The temperature of the gas leaving the cooler 15, at 75 to 85° F. is changed unavoidably in the exhauster by compression to about 100° F.

The accumulated condensate in the receptacle 17, consists of tar, tarry oils and water,—the latter containing a certain percentage of free and fixed ammonia, this water, or weak ammonia liquor, is brought to a separting tank 21, where the tar sinks by gravity, thus separating from the ammoniacal liquor. The tar is removed by the downwardly directed line 22, while the ammoniacal liquor flows off from the top by line 23, either to a storage or feed tank, or, as shown in the diagram, directly into the still 24. Up to this stage of the process no claims are made as to any improvements or inventions, as there are several such systems in operation.

The ammonia still 24 is fed by the ammoniacal vapors through the top, the ammoniacal vapors being changed in temperature, as hereinafter described. Almost any still for the manufacture of ammonia vapors from weak ammoniacal liquor will answer the purpose. On top of the still there is a heat exchanger 25, wherein the aqueous vapors developed in the still and ascending, flow counter-current to the cold liquor entering and the vapors are thus cooled off to a temperature required by the pressure demanded by the seal 26, in the saturator hereinafter described. This cooling has a two-fold purpose: To make use of the sensible heat of the ammonia vapors, if beyond the requirements of pressure to heat the ammoniacal liquor, in order to economize steam in the stills, and secondly, to prevent high temperature from carrying along in suspension a large amount of water which may dilute the bath in the saturator. Furthermore the temperature of the ammoniacal vapors is thus regulated to produce the required heat energy to keep the bath, as well as the gas in the saturator at a given uniform temperature. The ammoniacal vapors are conducted by means of pressure produced by their own initial or regulated temperature, through line 27, to saturator 20. Through cracker pipe 28, the vapors are brought into the acid bath, maintained at a separate level from that of the bath for the gas. The dip of the cracker pipe 28 into the bath is only as much as the wash or surge of the gas bath demands and is less than the dip of the cracker pipe for gas, referred to later on. The sulfate formed falls to the bottom of the saturator while the waste vapors ascending in secondary shell 29, are removed by stack draft to the atmosphere through line 30. These waste vapors contain water, sulfureted hydrogen, carbonic acid, hydrocyanic acid, and traces of hydrochloric acid, and will, if permitted to escape with the regular gas, contaminate the same as well as reduce its heating power. Counter-current to the ascending waste vapors, sulfuric acid is sprayed in order to thoroughly wash the vapors of the least traces of ammonia. This spray forms the acid feed for the central part of the saturator bath, serving the high level of the total bath.

In order to catch particles of acid solution which may rise with the vapors, an acid spray catcher 31, is inserted between the outlet of the secondary shell 29, and the waste gas pipe 30, leading to the stack or atmosphere. The risidues of this catcher are collected in a mother liquor pit, not shown, and brought back to the saturator by means of a jet. The secondary shell 29 acts not only as a separator for vapors and gas, to prevent their mixing together by dipping into the acid bath below the level of the vapor and gas cracker pipe, but it transfers the sensitive heat of the ascending waste vapors to the descending gas in the primary shell 32. Due to the high temperature of the ammoniacal vapors reaching the bath in the center of the saturator, aided by the temperature due to reaction of the sulfuric acid bath, the temperature of the bath inclosed by the secondary shell 29, is much higher than the temperature of the bath surrounding said shell. A heat exchange between the bath inside and outside of the secondary shell is actuated first by the acid feed in the secondary shell, causing the bath inside of this shell to be of somewhat greater specific gravity. Secondly, the action of the sulphate ejector 33, will cause the flow of the bath in a downward direction. In this manner the heat absorbed by the vapor bath from the ammoniacal vapors is distributed over the entire saturator, making the re-heating of the gas absolutely unnecessary, and permitting of maintaining in one and the same bath two different temperatures, produced entirely by waste heat of the products treated. The separate level of the vapor bath is established by the fact that the waste vapors incased by the secondary shell 29, are subject to draft, as previously referred to, or if desired, to atmospheric pressure, the level of the gas bath being maintained by an atmospherical seal and level regulator on the outside of the saturator shell.

The gas reaches the saturator 20, under pressure, through the primary shell 32, and takes up heat distributed by the secondary shell 29, as previously referred to. The temperature of the gas leaving the exhausters at 100° is thus maintained, and the loss by radiation in the piping between the exhauster 14, and saturator 20, is balanced. The heating of the gas to a temperature permitting the absorption of the surplus water entering with the acid is therefore accomplished entirely in the bath, which received the heat energies required from the waste heat of the vapor bath, and the reaction of the acid in the total bath. This temperature must be regulated as previously referred to, the temperature of the heat depending entirely on the strength of the acid used in the process, hence it is necessary to remove, by means of the heat of the gas which is leaving the bath, all of the water which has been carried into the acid bath by incoming gas. No concise data can be given for the correct temperature to be maintained in the gas leaving, as this depends entirely and solely on the difference of vapor tension between water and the moisture of the bath. The regulation is accomplished by the temperature at which the ammoniacal vapors are permitted to leave the heat exchanger at the ammonia still; that is by the application and regulation of waste heat. From the primary shell 32, the gas is distributed by the cracker pipe 34, over the entire surface of the saturator bath proper, and escapes under pressure by line 35, to the acid spray separator 36, from whence it is distributed to the place of consumption. The gas leaving on the outside of the primary shell 32, under pressure will naturally depress the level of the bath which, under atmospheric conditions, would be equal to that inside of the secondary shell 29. A balance is maintained by an annular seal and level regulator placed outside of the saturator and connected with the bath by a series of by-passes. The fluctuations in the bath on the high pressure side of the saturator are thus controlled and an over-flow is provided in the annular seal to maintain the high level of the bath inside the secondary shell.

The sulfate deposited by the entire bath, the hot and cold sections thereof, is removed by the ejector 33, to a series of draining tanks 37, from which the separated acid liquor is conducted to the annular seal and there used again in the saturator. This liquor retains a large amount of its original heat, and in my process this heat is utilized in the annular seal to prevent radiation of heat from the top of the acid bath through the saturator walls.

I claim:

1. The method of purifying gases of carbonization which consists in separating from the gas the first condensate consisting of tars, tar oils and moisture; decanting off the weak ammonia liquor, cooling the gas to a temperature of 75° to 85° F., distilling the resulting condensate and the weak ammonia liquor, compressing the gas to a point at which the temperature of the gas is approximately 100° F., then passing the gas through one compartment of a saturator and passing the vapors of distillation of the ammonia liquor through a separate compartment of the same saturator, transferring heat from the vapors to the gas to bring the gas to approximately a temperature of 105° F. in the saturator, then passing the gas to the distributing mains and the waste gases from the vapors to the atmosphere, substantially as described.

2. The method of purifying gases of carbonization which consists in separating from the gas the first condensate consisting of tars, tar oils and moisture, decanting off the weak ammonia liquor, cooling the gas to a temperature of 75° to 85° F., distilling the resulting condensate and the weak ammonia liquor, compressing the gas to a point at which the temperature of the gas is approximately 100° F., then passing the gas through one compartment of a saturator and passing the vapors of distillation of the ammonia liquor through a separate compartment of the same saturator, supplying said saturator with sulfuric acid by spraying said acid into the departing vapors, the heat of the reaction and of the vapors from the still increasing the temperature of the gases to approximately 105° F., substantially as described.

3. The method of recovering ammonium sulfate from gases of carbonization, which comprises cooling of the gases to free them from tarry matters and water vapors and condensing the water vapors containing a certain percentage of the free and fixed ammonia liberated from the coal by distillation, distilling the condensate and cooling the resultant vapors to a temperature consistent with the pressure of the seal required for the vapor bath in the saturator, this temperature to be of sufficient degree to keep a portion of the vapor bath at its proper temperature, and to heat the bath for the gas inside the same saturator to a temperature not less than 105° F., substantially as described.

4. The method of recovering ammonium sulfate from gases of carbonization, which comprises cooling of the gases to free them from tarry matters, and water vapors, and condensing the water vapors containing a certain percentage of the free and fixed ammonia liberated from the coal by distillation, distilling the condensate and cooling the resultant vapors to a predetermined temperature, passing these vapors through a high temperature zone of the saturator and spraying sulfuric acid counter-current to the waste vapors emerging from the acid bath, substantially as described.

5. The method of recovering ammonium sulfate from gases of carbonization which comprises cooling of the gases to free them from tarry matters and water vapors and condensing the water vapors containing a certain percentage of the free and fixed ammonia, liberated from the coal by distillation, distilling the condensate and introducing the gases of carbonization and the vapors of distillation independently into the saturator under differential pressure and at differential temperature, utilizing the higher heats of the vapors to keep a balance of temperature in the gas entering the saturator simultaneously with the vapors and diffusing the high temperature of the vapor bath to maintain a proper low temperature in the bath for the gas, substantially as described.

6. The method of recovering ammonium sulfate from gases of carbonization, which comprises cooling of the gases to free them from tarry matters and water vapors and condensing the water vapors containing a certain percentage of the free and fixed ammonia liberated from the coal by distillation, leading the gases and vapors independently into the same saturator, removing the sulfate formed from the said saturator, draining the salts extracted and utilizing the hot liquor separated from the salts to prevent radiation of the bath through the outside walls of the saturator, substantially as described.

FREDERICK TSCHUDY.

Witnesses:
W. GRANT HARBISON,
M. M. HUGHES.